United States Patent
Montagner

(10) Patent No.: US 8,128,219 B2
(45) Date of Patent: *Mar. 6, 2012

(54) ELASTIC MINIATURIZED HINGE FOR A FLEXIBLE TEMPLE ELEMENT OF THE GLASSES

(75) Inventor: Luciano Montagner, Susegana (IT)

(73) Assignee: Ideal SRL, Quero (BL) (IT)

( * ) Notice: Subject to any disclaimer, the term of this patent is extended or adjusted under 35 U.S.C. 154(b) by 370 days.

This patent is subject to a terminal disclaimer.

(21) Appl. No.: 12/369,593

(22) Filed: Feb. 11, 2009

(65) Prior Publication Data

US 2009/0284710 A1 Nov. 19, 2009

(30) Foreign Application Priority Data

May 14, 2008 (IT) .............................. TV2008A0072

(51) Int. Cl.
*G02C 5/22* (2006.01)
(52) U.S. Cl. ........................... 351/153; 351/113; 16/228
(58) Field of Classification Search .................. 351/153, 351/113, 114, 41, 111, 158; 16/228
See application file for complete search history.

(56) References Cited

U.S. PATENT DOCUMENTS 6,631,194 B2 * 10/2003 Fukuoka ....................... 381/113
2006/0179609 A1  8/2006 Huang

FOREIGN PATENT DOCUMENTS

| EP | 0679920 | 11/1995 |
| FR | 2702573 | 9/1994 |
| IT | 1288611 | 10/1997 |

* cited by examiner

*Primary Examiner* — Hung Dang
(74) *Attorney, Agent, or Firm* — Egbert Law Offices PLLC

(57) ABSTRACT

The present invention is an elastic miniaturized hinge for flexible temple elements or "flex temples" with a box provided with at least a guiding zone for the connection of the articulation to a seat joined to the front of the glasses. The hinge includes a box, along the temple or lug of the glasses, and a housing along the box containing the articulation trolley. The articulation trolley includes at least one spring, contained inside the box, while the portion that includes the articulation exits from the front end of the box. Peripherally with respect to the opening at the front end of the box, at least one guiding zone is obtained, including a cheek of a protrusion longitudinally projected. The cheek is parallel and orientated toward at least one of two lateral faces of the articulation. Furthermore, the protrusion is provided with a guiding seat with an opening.

4 Claims, 2 Drawing Sheets

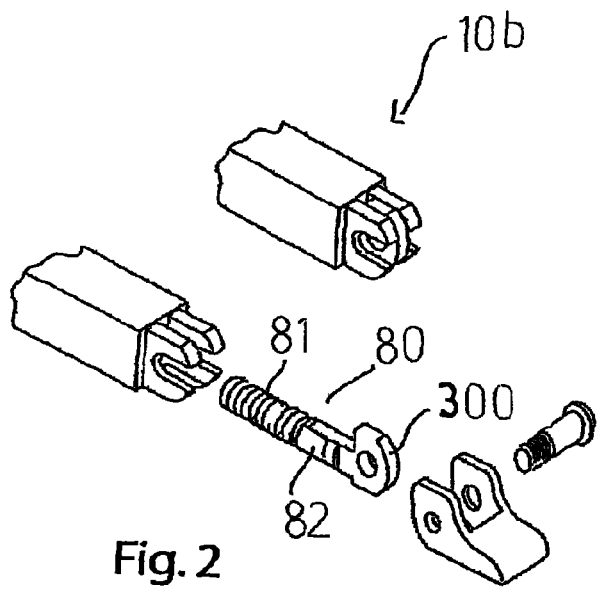
Fig. 2
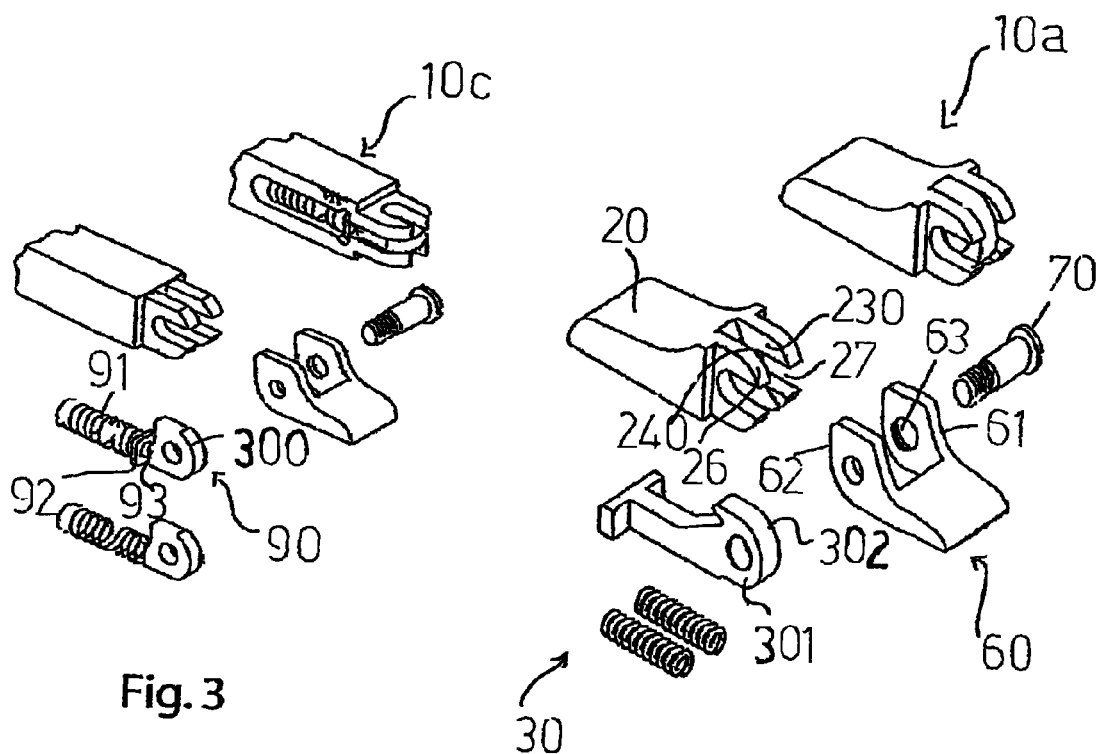
Fig. 3
Fig. 1

ELASTIC MINIATURIZED HINGE FOR A FLEXIBLE TEMPLE ELEMENT OF THE GLASSES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to an elastic miniaturized hinge for a flexible temple element with a box provided with at least a guiding zone for the connection of the articulation to a seat joined to the front of the glasses.

The invention finds particular even if not exclusive application in the field of the production of components for flexible temple elements or "flex-temples" for frames of glasses and in the metallic small items for related hinges.

2. Description of Related Art Including Information Disclosed Under 37 CFR 1.97 and 37 CFR 1.98

The temples, on their ends and at the opposite side in respect to the terminations, are provided with associated elasticized hinges, a hinge being called a "flex", which allows engagement with an elasticized function to a front part of the glasses, properly called a lug. There is a predominantly turn-over or extra-opening of the temples function, that, in this way, is defined as a "flex-temple", being obtained on both sides of the glasses and having the advantage to confer a greater fit. The glasses result in a more wearable and adaptable form for the different anatomical conformations of each person. Moreover, it has the value to favor an effective absorption action of accidental impacts, avoiding an excessive stress of both the otherwise utilizable hinges and of the corresponding temples placed on the sides of the glasses.

Today, the most spread elastic hinges look substantially complex, requiring excessive sizes in the components, which collides with the present tendency to minimize the sizes themselves in order to make the frame of the glasses more charming, with lower visual impact and lower weight.

It also happens that the required precision components are innumerable, and as a result, their assembly by the production unit, requires production time and costs.

The now-mentioned circumstances have therefore induced the companies of the sector to reach to the implementation of elastic hinges, which offer a refined functionality, though being more reduced in size and aiming, at the same time, to reduce the components, facilitating their assembly, and reducing the costs.

The research of size reduction produced a series of size clearances and physiological conditions, such as rotation clearances of the temples in the opened or closed position, during the extra-opening movement, and vertical translation clearances of the temples in any working position of the glasses.

FR2702573 (Chevassus), describes an elastic hinge. A box is included in it, inside of which a tie-rod is axially movable, one end of which is hingeable to the lug of the glasses, and one opposite end of which ends with a perpendicular section to form a shoulder. In this way, a tie-rod is obtained, inside the box, provided with a longitudinal seat which houses a compression spring, one end of which is placed in abutment with said shoulder, while the opposite end, is arranged in abutment with a second striker, obtained at the end of a guiding rod coaxially introduced in said spring. The guiding rod, on the opposite side, is provided with a particular wedge-shaped head, intended to be butted in a corresponding receptacle obtained by a second portion, which is longitudinally developed and integral with the tie-rod. This portion is provided along one side with a spike which, being protruding towards the intrados of the box, during the assembly, engages in one corresponding seat, realizing a stable constraint between the tie-rod and the box in order to prevent the extraction of said tie-rod.

IT1288611 (Montagner), is an elastic hinge for glasses temples, essentially comprising a box, being associated, when finished, to the temple by means of a tacking and preassembly, inside of which two springs are housed. The springs, on one side with their ends, are in abutment to the bottom of the box, and on the other side, the springs are arranged in abutment to the end of a tie-rod, to which they are arranged one for each side. The shape of the tie-rod is substantially "T" shaped provided at the opposite end with a convenient hole, being hingeable to a corresponding lug provided on the frame of the glasses.

EP0679920 (OBE-Werk), provides three solutions for elastic hinges. A first one is characterized by the presence of a tie-rod coaxial to a spring, placed axially with respect to a box opened along one side, on the end of said tie-rod means being ensured acting as rabbet for an end of a compression-spring. The opposed end of the aforementioned spring engages at a shoulder obtained inside of the box, in such a way that, during the application of the tie-rod in the room of the same, the spring is submitted to a precompression and held in this condition. A second provision consists in the providing the monolithic realization of the tie-rod and with a "L" shape, which, in the intermediate position, holds the related spring during the assembling in the obtained housing and similarly holds the related spring in a precompression condition. Finally, a third tie-rod solution is recalled, always of the monolithic type. The latter, apart from the traditional flat head of the hinge, provided with a related hole, provides a body, having a quadrilateral section, or longitudinally protruding shank ending with a transverse portion. Some particular springs are obtained perpendicularly developing on the sides, that is along the sides of said shank, and integral with the same, said springs being obtained from a plate whose shape looks like an undulated sequence.

The company Comotec, www.comotec.com proposes a hinge model called Optimum Flex, which suggests a box with a prolongation along one side to constitute a protrusion insinuated between the two walls of the lug joined to the front of the glasses. It looks like it is a device substantially conceived to avoid the torsional oscillations of the hinge in working conditions of the articulation.

It is therefore reasonable to consider known the elastic hinge that includes:

a box, along the temple or lug of the glasses;

a housing along the box containing the articulation trolley;
the articulation trolley, which includes at least one spring and is housed inside of the box, while the portion including the articulation exits from the front end of the box; and
a corresponding seat, obtained on the front of the glasses, to which the articulation is hinged.

The described solutions, particularly with reference to corresponding articulation, have a series of clearances and physiological slacks, such as rotation clearances, e.g. in the opened or closed position, or during the extra-opening movement, as well as vertical translation clearances in any working position.

As a whole, from these introductory considerations, one can perceive how important it is to find alternative solutions.

Therefore, an aim of this invention is also to avoid the above-mentioned drawbacks.

BRIEF SUMMARY OF THE INVENTION

This and other aims are achieved by the present invention according to the characteristics in the included claims, solving the abovementioned problems by means of an elastic miniaturized hinge for flex temples with a box provided with at least a guiding zone for the connection of the articulation to a seat joined to the front of the glasses. The hinge includes:
a box, along the temple or lug of the glasses;
a housing along the box containing the articulation trolley; and
the articulation trolley, which includes at least one spring and which is contained inside of the box, while the portion that includes the articulation exits from the front end of the box;
wherein, peripherally with respect to the opening of the housing obtained at the front end of the box, at least one guiding zone is obtained, said guiding zone consisting of a cheek of a protrusion longitudinally projected with respect to the box, where said cheek is parallel and orientated toward at least one of two lateral faces of the articulation. Furthermore, said protrusion is provided with a guiding seat with an opening along the front profile and longitudinally projected with respect to the sliding longitudinal axis of the articulation trolley.

In this way, by means of the considerable creative contribution which effect constitutes an immediate technical progress, different aims and advantages are achieved.

The connecting element that can be a screw, a pin, or a stud, is guided by the guiding zones/seats of the cheeks located on the box.

The guiding seats allow an easier insertion of the joining element in the system itself. For example, in the traditional system with a screw, its insertion results are very simplified.

It is possible to eliminate the seat that avoids the axial rotation of the articulation because this one is replaced by the guiding system.

There is greater resistance of the system in the closing, opening and extra-opening movement, as the system allows having the sliding elements guided in any position.

There is greater resistance to the side bendings for the same reasons of the previous point.

It is possible to apply the present invention on products with any size, even very large sizes, because, unlike the mechanisms at present on the market, increasing height of the product corresponds in the same extent to increasing the precision of the mechanism.

It is possible to avoid having to leave the articulation slide on a contacting surface, as sometimes at present one recurs to in order to contain the clearances, because the guiding system makes its realization superfluous.

It is possible to use the guiding zones as contact points to limit the strokes, both, the opening, the closing and the extra-opening strokes.

It is possible to use the guiding zones for the housing of springs, studs or related seats, in order to have a considerable reduction of the size of the hinge.

The guiding zones may neither be in contact with the articulation, e.g. obtaining four tongues on the external element, being it both the hinge, the lug, the temple or another one.

These and other advantages will appear from the following detailed description of a preferred embodiment with the aid of the enclosed schematic drawings whose embodiment details are not to be considered limitative but only illustrative.

BRIEF DESCRIPTION OF THE SEVERAL VIEWS OF THE DRAWINGS

FIG. 1 represents an exploded perspective view of a first embodiment of the elastic hinge.

FIG. 2 represents an exploded perspective view of a second embodiment of the elastic hinge.

FIG. 3 represents an exploded perspective view of a third embodiment of the elastic hinge.

DETAILED DESCRIPTION OF THE INVENTION

Figure 4:
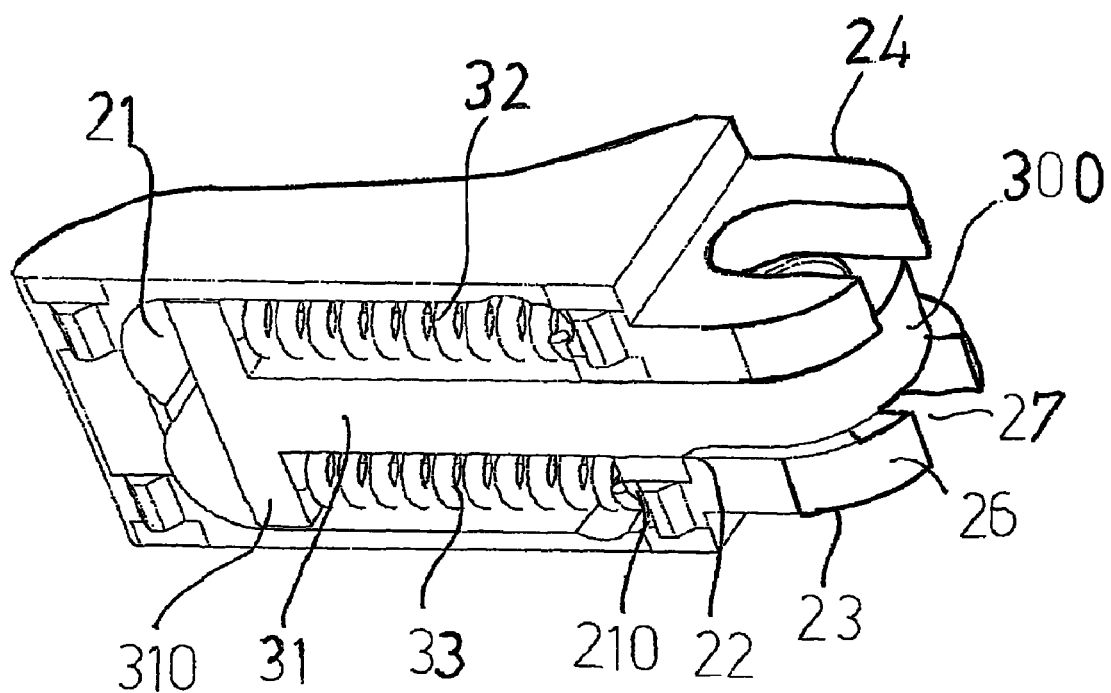
FIG. 4 represents a perspective view from the bottom of the embodiment of the elastic hinge as for FIG. 1.
Figure 5:
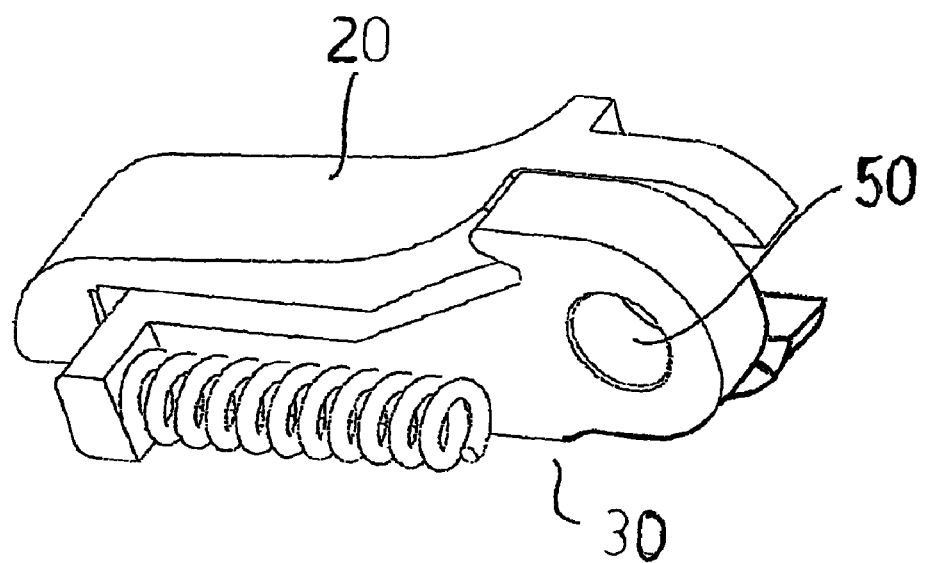
FIG. 5, represents a partial perspective view from the top of the hinge as for FIGS. 1 and 4.

A first embodiment of the elastic hinge (10a) (FIGS. 1, 4 and 5), with a flexible flex temple in a frame for glasses, is composed of a box (20), sidelong opened, inside of which a housing (21) is obtained to contain the trolley (30) of the articulation (300). The box (20) at the front part is provided with an opening (22) through which the articulation (300) of the trolley (30) exits, and from the sides of which two parallel protrusions (23, 24) longitudinally protract. Each protrusion (23, 24) of the box (20) presents a guiding zone, that in this case includes two internal cheeks (230, 240) the one facing the other, among which, in a hinge mounted condition (10a), the two parallel and opposite flat faces (301, 302) of the articulation (300) are arranged. In a hinge (10a) mounted condition, each flat face (301, 302) looks towards and is positioned against the corresponding cheek (230, 240). In a further embodiment, a self-lubricating element with low friction coefficient may be interposed between the flat face (301, 302) and the corresponding cheek (230, 240). Furthermore, one can observe that each protrusion (23, 24) is provided with a channel-shaped guiding seat or slot (27), which is longitudinally projected with respect to the sliding longitudinal axis of the trolley (30) of the articulation (300). More in detail, each protrusion (23, 24) has the guiding seat (27) with an opening obtained along the front border (25). In a hinge (10a) condition with the trolley (30) of the articulation (300) assembled (FIG. 4), the articulation (300) is interposed between the two protrusions (23, 24), in such a way that the through-hole (50) correspond to the guiding seats (27) of the two protrusion (23, 24).

The connection of the hinge (10a) to the lug (60) which is joined to the front of the glasses, is obtained by inserting between the two parallel walls (61, 62) of the lug (60). Both are provided with a corresponding hole (63), the forepart of the box (20) and specifically the two protrusions (23, 24)

among which the articulation (300) is interposed, provide the screw connecting element (70) to be passing through the corresponding hole (63) of at least one of the parallel walls (61, 62) and therefore through the guiding seat (27) of at least one of the protrusions (23, 24) engaging the articulation (300) which is hinged in the through-hole (50).

Concerning the trolley (30) of the articulation (300) (FIG. 4), it is of the types made of a tie-rod body (31) with a rectilinear development and with "T" shaped rear end to the sides of which two compression springs (32, 33) are arranged. Each of the springs (32, 33) is arranged with the rear end in abutment to the orthogonal portion (310) of the tie-rod body (31), while the front end engages against the internal wall (210) of the housing (21) containing the trolley (30) of the articulation (300).

Operatively, the hinge (10a), when the flex temple is stimulated in an extra-opening condition, causes the articulation (300) to perform a longitudinal movement with respect to the box (20) held by the guiding zones consisting of the concurrence of internal cheeks (230, 240) and of the corresponding guiding seat (27) that controls the movement of the transverse screw (70) for the fixing to the lug (60) of the front portion.

In the embodiment of FIG. 2, a variant of the hinge (10b) is shown in which a different design of the trolley (80) of the articulation (300) is present. In this case, the trolley (80), which is always contained inside of the box (20), is composed by a rectilinear tie-rod body which is coaxial with respect to a helicoidal spring (81), said spring (81) being with the rear end in abutment to the base of the tie-rod body, while at the front end said spring (81) engages against the shoulder of the stop portion (82) that precedes the articulation (300).

Another variant of the hinge (10c) is represented by the embodiment of FIG. 3. In this case, the design of the trolley (90) of the articulation (300) is similar to the one of FIG. 2. More in detail, the spring (91) at the front end engages against a blocking plate (92) which is transverse with respect to the stop portion (93) that precedes the articulation (300).

REFERENCE (10a, 10b, 10 c) elastic hinge
(20) box
(21) housing
(30) trolley
(300) articulation
(22) opening
(23, 24) protrusions
(230, 240) internal cheeks
(301, 302) flat faces
(27) Channel-shaped guiding seat
(26) front border
(50) through-hole
(60) lug
(61, 62) parallel walls
(63) hole
(70) joining element, screw
(31) tie-rod body
(32, 33) compression springs
(310) profile of the tie-rod body
(210) internal wall
(80) trolley
(81) helicoidal spring
(82) stop portion
(90) trolley
(91) spring
(92) blocking plate

I claim:

1. An elastic miniaturized hinge for use with a flexible temple of eyeglasses, the hinge comprising:
a box suitable for affixing to the temple or a lug of the eyeglasses;
a housing formed in said box;
a trolley contained within said housing, said trolley having an articulation at one end thereof;
at least one spring positioned in said box housing and bearing against said trolley, said articulation extending outwardly of one end of said box, said housing having an opening at said one end of said box; and
a guiding zone formed at said opening of said housing, said guiding zone having a first protrusion and a second protrusion in generally spaced parallel relationship to each other and extending longitudinally outwardly therefrom, said first protrusion having a cheek facing a cheek of said second protrusion, said articulation having a first lateral face and a second lateral face on opposite sides thereof, said first lateral face being adjacent to and in sliding relation with said cheek of said first protrusion, said second lateral face being adjacent to and in said sliding relation with said cheek of said second protrusion, each said first and second protrusions having a guiding seat opening at an end thereof so as to define a slot extending toward said end of said housing, said slot having a longitudinal axis aligned with and in parallel relationship with a longitudinal axis of said trolley.

2. The hinge of claim 1, said trolley having a tie-rod body having a T-shape at a rear end thereof, said at least one spring comprising pair of compression springs having a rear end bearing on said T-shape of said tie-rod body, said pair of compression springs having a front end bearing against an internal wall at a front end of said housing.

3. The hinge of claim 1, said trolley having a rectilinear tie-rod body, said at least one spring being a helicoidal spring, said tie-rod being coaxial with said helicoidal spring, said helicoidal spring having a rear end bearing against a rear end of said tie-rod body, said helicoidal spring having a front end bearing against a shoulder of a stop portion formed forward of said rear end of said tie-rod body.

4. The hinge of claim 1, said at least one spring having a front end engaging a blocking plate extending transversely with respect to said articulation.

* * * * *